United States Patent Office 3,840,641
Patented Oct. 8, 1974

3,840,641
RECOVERY OF BROMINE FROM TERE- AND ISO-PHTHALIC ACID PROCESS RESIDUES
Gene L. Wampfler, Lombard, and Hans P. Pohlmann, Naperville, Ill., assignors to Standard Oil Company, Chicago, Ill.
No Drawing. Filed Oct. 20, 1972, Ser. No. 299,411
Int. Cl. C01d 3/00, 7/26; C01g 51/06, 45/00
U.S. Cl. 423—189                    6 Claims

ABSTRACT OF THE DISCLOSURE

Subject recovery provides aqueous solution of bromine as its sodium salt substantially free of other metals through incineration of dissolved and/or solid organic materials separated from catalyst metals by use of sodium carbonates and water, aqueous extraction of gases and solid products in incinerator effluent and separation of sodium carbonate as its bicarbonate derivative from the aqueous extract solution. Such recovered sodium bromide solution is a useful bromine source for preparation of benzene carboxylic acids by oxidation of methyl-substituted benzenes with molecular oxygen in the presence of a liquid phase acetic acid solution catalyst components comprising metal catalyst and a source of bromine. Recovery of some benzene carboxylic acid products, such as tere- and iso-phthalic acids, and acetic acid solvent from the commercial fluid oxidation reaction effluent leaves a residue containing bromides, oxidation metals primarily as water-soluble salts, acidic and neutral (e.g. ester and aldehyde) aromatic compounds, and extraneous corrosion metals which have a deleterious effect on oxidation and cannot be recycled to the oxidation with the catalyst components. Leaching of such residues with water extracts some of the acidic aromatic compounds but selectively extracts catalyst metals which can be precipitated as their carbonates by sodium carbonates for catalyst metal recovery. The leached solids and aqueous solution left after catalyst metal carbonate recovery provides the incineration feed for bromine recovery.

BACKGROUND OF THE INVENTION

In copending applications Ser. No. 206,885 and Ser. No. 206,886 filed Dec. 10, 1971 there are disclosed techniques for recovering catalyst metals free from extraneous corrosion metals by treating residues obtained from the recovery of aromatic acid product and separation of acetic acid solvent from fluid oxidation effluent from the commercial oxidation of methylbenzenes, especially p- and m-xylenes, with molecular oxygen (e.g. air or oxygen gas) in the presence of a liquid phase acetic acid solution of catalyst components comprising one or more metal oxidation catalysts and a source of bromine. Such residues (hereinafter "aromatic acid process residue") contain bromides, oxidation metals primarily as water-soluble salts, extraneous corrosion metals (e.g. Fe, Cr and/or Ni) having a rate of oxidation inhibiting effect and not suitable for recycle with catalyst components to the oxidation, and acidic and neutral (e.g. ester and aldehyde) aromatic compounds. Both of those catalyst metal recovery techniques treat the aromatic acid process residue with water and an alkali metal carbonate.

One of the above catalyst metal recovery techniques comprises combining aromatic acid process residue with water and alkali metal, suitably sodium or potassium, carbonate in amounts which dissolve the acidic aromatic compounds content of the residue as alkali metal salts at a slurry pH above 7, e.g. in the range of pH 8.0–9.5. This leaves as a solid a mixture of the neutral aromatic compounds and carbonates of contaminant corrosion and catalyst metals in water from which said neutral compounds can be removed by solvent extraction or steam distillation. The metal carbonates are dissolved in aqueous acetic acid (50–60% acetic acid content) used in 5–20% excess over the stoichiometric amount required to convert the metal carbonates to metal acetates. Excess acetic acid is removed by distillation to pH 4.5–5.8 whereat an insoluble form of extraneous corrosion metals precipitate and are removed. The aqueous alkaline phase contains alkali metal salts of acidic aromatic compounds and bromine compounds as solutes from the aromatic acid process residue.

The second technique selectively extracts the catalyst metal or metals from the aromatic acid process residue by leaching it with water in the respective weight ratio of 1.0:1.0–10.0 at temperatures from ambient to 100° C. for 30 to 120 minutes. Insoluble solids (extraneous corrosion metals and neutral and acidic aromatic materials) are separated at a temperature in the range of 25–100° C. The extract solution is combined with alkali metal carbonate or bicarbonate to a pH in the range of pH 7–8.1 to precipitate catalyst metal carbonate substantially free of extraneous corrosion metals. Separation of the catalyst metal carbonate precipitate leaves an aqueous phase containing most of the bromine content of the aromatic process residue. The remainder of the bromine is in the insolubles. Such insolubles amounts to from 50–85 weight percent of the original residue.

There are some aromatic acid process residues which do not lend themselves to such recoveries of catalyst metals. Such residues are, in general, from the preparation of benzene polycarboxylic acids which are recovered as distillable intramolecular anhydrides. Examples of such aromatic acid process residues are those obtained from the preparation by the before-mentioned catalytic liquid phase oxidation of trimellitic acid, o-phthalic acid or pyromellitic acid which are separated and/or recovered from the fluid oxidation effluent as the corresponding intramolecular anhydride. During thermal exposure of the oxidation effluent either for removal of acetic acid, or for conversion of the polycarboxylic acid to and recovery of its intramolecular anhydride, or for both acetic acid removal and anhydride formation and recovery, one-half or more of the catalyst metals become bound in some unknown complex form, from which the catalyst metals cannot be leached or extracted as above described.

A process has been devised for recovery of bromine values from the aromatic acid process residue and that bromine recovery compliments the foregoing recoveries of catalyst metals where applicable to the aromatic acid process residue.

The magnitude of commercial production of terephthalic acid and isophthalic acid by catalytic liquid phase oxidation of the respective xylene in the presence of acetic acid solution of a source of bromine and heavy metal oxidation catalysts such as cobalt, manganese or mixtures of cobalt and manganese far outranks similar production of the other aromatic carboxylic acids mentioned. Neither tere- nor iso-phthalic acid form a distillable intramolecular anhydride and both are recovered by processes which do not cause the catalyst metals to become unextractably bound. For those reasons the devised process for bromine recovery, which is the subject of the present invention, will be limited in application to terephthalic acid process residue and isophthalic acid process residue.

SUMMARY OF INVENTION

The present inventive bromine recovery method comprises obtaining a mixture of sodium bromide and sodium carbonate by thermal conversion of the bromine-containing aqueous phase with or without insoluble or separated aromatic compounds remaining after the before described catalyst metal recovery by treatment of tere- or iso-phthalic acid process residue with water and sodium bicarbonate or carbonate, dissolving the mixture of sodium bromide and carbonate in water, removing sodium carbonate from said solution by reacting said carbonate with carbon dioxide to form sodium bicarbonate as a precipitate and separating the aqueous solution of sodium bromide from precipitated sodium bicarbonate.

EMBODIMENTS OF THE INVENTION

The conversion of sodium carbonate with carbon dioxide to precipitated sodium bicarbonate and its recovery can be accomplished in any suitable manner, for example, by the use of the well-known preparation and recovery of sodium bicarbonate by carbonation of aqueous solution of soda ash. Such preparation, as applied to the present process, would be carried out by charging the aqueous solution of sodium bromide and sodium carbonate, substantially saturated with respect to sodium carbonate, into the top of a carbonating and precipitating tower and $CO_2$ gas or a mixture of gases containing $CO_2$ is introduced into the bottom of the tower. The bicarbonate precipitate is withdrawn from the bottom of the tower as a slurry in a portion of the aqueous mother liquor containing sodium bromide and the other portion of said aqueous mother liquor is taken as an overflow stream from the top of the tower. Said slurry of bicarbonate is subjected to solid-liquid separation, for example, filtration or centrifugation, and is water washed to displace adhering aqueous mother liquor. The wash liquor is combined with the mother liquor overflow stream. The aqueous composite is concentrated to a sodium bromide content of 30 to 45 weight percent for use as a bromine source for the before described oxidation process for preparation of tere- or iso-phthalic acid. The separated sodium bicarbonate with or without drying can be recycled to catalyst metal recovery or heated to a temperature above 50° C. to convert it to sodium carbonate and liberate a mixture of water vapor and carbon dioxide for reuse in the carbonation. The sodium carbonate can be recycled to catalyst metal recovery.

Such carbonating and precipitating towers can be either the plate and bubble up gas dispersing design of the Solvay tower or the series combination of inverted pear-shaped vessels known as the Honigmann apparatus wherein the vessels are operated under a positive $CO_2$ pressure with $CO_2$ charged through a dip leg in each vessel to flow countercurrent to charged solution of sodium bromide and sodium carbonate so that the vessel having highest $CO_2$ concentrations has highest sodium bicarbonate content with respect to the known equilibrium between $CO_2$ and $NaHCO_3$ at operating temperature and pressure. Separation of bicarbonate produced from either the Solvay tower or Honigmann apparatus can be done on a continuous, rotary vacuum filters having a large number of pressure rolls or in cycle-controlled, continuously running centrifuges.

Also said carbonation of sodium carbonate to bicarbonate can be accomplished in an upflow tower wherein both the aqueous solution of sodium bromide and sodium carbonate and dispersed gas containing $CO_2$ are introduced at the bottom of the tower, the suspension of sodium bicarbonate in aqueous solution of sodium bromide overflows from the top of the tower, the suspension is collected and the suspension is charged to a straight-line filter system countercurrent to water washing. The sodium bromide containing mother liquor is taken from the filter system and concentrated to a sodium bromide content of 30 to 45 weight percent. The aqueous wash liquor is used to form the initial solution of sodium bromide and sodium carbonate. The separated, washed sodium bicarbonate is either recycled to catalyst metal recovery or is converted to sodium carbonate for recycle to catalyst metal recovery.

The sodium bicarbonate or carbonate products recovered for reuse according to the foregoing carbonation, precipitation and separation processes will contain, on the first pass, 7–10% of the original bromine as sodium bromide. But the recycle of such sodium bicarbonate or carbonate products to catalyst metal recovery permits recovery of substantially all of the bromine as sodium bromide in the concentrated aqueous solutions thereof.

From the foregoing, it is apparent that the present inventive process advantageously compliments catalyst metal recovery from tere- or iso-phthalic acid process residue but the two recovery processes need not be operated in sequential combination although such sequential operation affords an efficient engineering design auxiliary to the preparation of those phthalic acid isomers.

For such combinations of catalyst metal recovery with the present bromine recovery, it is preferred to use incineration at 900–1000° C. as the thermal conversion to obtain mixtures of sodium bromide and sodium carbonate from the aqueous phase alone or with aromatic insolubles from the second catalyst metal recovery process before described.

For the purposes of the present inventive process of recovery of bromine, any source of $CO_2$ present in the process or combination processes is suitable. For example, $CO_2$ from incinerator flue gas, reconversion of sodium bicarbonate to its carbonate and dissolution of catalyst metal carbonates in acetic acid from among other sources of $CO_2$ can be satisfactory sources of $CO_2$.

It is known that sodium bicarbonate is less soluble in water than sodium carbonate. It is also known that sodium bromide as co-solute in water enhances the solubility difference between sodium carbonate and sodium bicarbonate. The mutual solubilities in water of the solute system: $NaBr$—$Na_2CO_3$—$NaHCO_3$ can be determined from data presented by A. Seidell and W. F. Linke in "Solubilities of Inorganic and Metal Organic Compounds" (4th Ed.), pages 835, 924; published (1958) by American Chemical Society. The mutual solubilities in water of that solute system indicate that carbonation of an aqueous solution of $Na_2CO_3$ at temperatures of at least 20° C., e.g., in the range of 25–35° C., will efficiently precipitate and provide low, less than 5 weight percent, residual $NaHCO_3$ in the final $NaBr$ solution provided that at least 10, and preferably 15 to 30 weight percent $NaBr$ solute concentration is maintained in the aqueous solution undergoing carbonation. It has been found that carbonating of the aqueous solution of $NaBr$ and $Na_2CO_3$ can be conducted at a temperature just below reconversion of bicarbonate to carbonate, e.g. just below 50° C., suitably in the range of 20 to 49° C., at atmospheric pressure. Carbonating temperatures of 50° C. and higher can be used in closed systems wherein the total pressure consists of a $CO_2$ pressure of at least 563 mm. Hg at 50° C. ($CO_2$ pressure in equilibrium with $NaHCO_3$) and at correspondingly higher $CO_2$ equilibrium pressures at higher temperatures. Satisfactory carbonation can be conducted with solution feed at 30 to 49° C., $CO_2$ at 60 to 25° C. and at $CO_2$ pressure of 0–50 p.s.i.

Water quenching of incinerator gases, after the effluent mixture of gases and solids pass into a solids precipitator, can provide wet flue gas containing $CO_2$ at 60° C. The hot solids 950–980° C. are scrubbed with water at atmospheric pressure, e.g. aqueous wash liquor at 30° C. from sodium bicarbonate recovery and make up water at 30° C., to quench said solids and dissolve therefrom sodium bromide and sodium carbonate. The total water used to form said solution is the amount which will provide a solution substantially saturated with, e.g. 30 to 35 weight percent, sodium carbonate at 100° C. Excess water for quenching must be provided to cool said solids to 100° C. Such excess water is converted to atmospheric pressure steam by the hot solids. Such low pressure steam is of no use so it can be vented to the atmosphere. The weight ratios of $Na_2CO_3$ to NaBr in said solutions will be in the range of 6–50:1.0.

Water leaching of all the sodium salts from the carbonaceous residue of pyrolysis is practiced. The leach liquor can contain 50 weight parts $Na_2CO_3$ for each weight part of NaBr. The amount of water for said leaching should provide, as above, 30–35 weight percent, i.e. substantially saturated with, $Na_2CO_3$.

The efficacy of recovering an aqueous solution of sodium bromide low in sodium bicarbonate by $CO_2$ treatment of an aqueous solution of NaBr and $Na_2CO_3$ is illustrated by the following five examples.

EXAMPLES 1–4

The following four solutions each with different concentrations of sodium carbonate and bromide salts are treated at ambient temperature (26–37° C.) with carbon dioxide gas alone or diluted with air to 17% $CO_2$ by volume. Sodium bicarbonate is recovered by filtration, washed with a minimum of water, wash liquor pressed out on a vacuum filter and is not converted to sodium carbonate. The results of these four carbonations are shown below in Table I.

TABLE I

| Example | 1 | 2 | 3 | 4 |
|---|---|---|---|---|
| $CO_2$ source | (1) | (1) | (1) | (2) |
| Solution composition: | | | | |
| NaBr, wt. percent | 30.8 | 18.2 | 10.0 | 18.0 |
| $Na_2CO_3$, wt. percent | 7.8 | 16.4 | 10.0 | 18.0 |
| $NaHCO_3$ recovered, percent [3] | 99.6 | 100.0 | 100.0 | 100.0 |
| Percent of initial NaBr in $NaHCO_3$ cake | 13.0 | 21.7 | 8.6 | 22.0 |
| Final solution: | | | | |
| NaBr content, wt. percent | 34.6 | 20.6 | 11.1 | 20.8 |
| $NaHCO_3$ content, wt. percent | 0.9 | 2.0 | 4.4 | 2.0 |

[1] 100% $CO_2$.
[2] 17 vol. percent $CO_2$ in air.
[3] Theoretical yield based on expected composition of final solution defined by mutual solubilities before mentioned.

The above data indicate that conversion of $Na_2CO_3$ to $NaHCO_3$ becomes more efficient when the solution of sodium carbonate and bromide salts has a NaBr concentration of 15–30% and above. Example 2, wherein NaBr concentration is maintained at about 16.5% by concentration of mother liquor after bicarbonate removal, illustrates this by carbonate conversion to bicarbonate of 99.2%. Although sodium bromide recovery in the final solution was only 75%, the recovered bicarbonate or carbonate contained the remaining 25%. Recycle of such recovered bicarbonate or carbonate to catalyst metal carbonate precipitation from extract solution of TA Residue would introduce said sodium bromide into the Aqueous Phase and thus upon reaching steady-state operations for a completely continuous process the sodium bromide, and hence bromine recovery, would approach 99% recovery.

EXAMPLE 5

This example illustrates the effect of starting with a solution of sodium carbonate and bromide salts with a sodium bromide concentration intermediate in the range of 15–30 weight percent. The solution carbonated with $CO_2$ gas at ambient temperature has 20 weight percent NaBr and 10 weight percent $Na_2CO_3$. Sodium bicarbonate is removed as formed and carbonation is stopped when no further bicarbonate precipitates. The final solution contains 21.4 weight percent sodium bromide (water is consumed by conversion of carbonate to bicarbonate) and 2.0 weight percent sodium bicarbonate. Bicarbonate recovery is 99.6 percent based on expected composition of final solution defined by mutual solubilities source before mentioned. The bicarbonate recovered contained 14.0 percent of the initial NaBr in the solution.

As illustrated above, separation of dissolved $Na_2CO_3$ from NaBr in aqueous solution is accomplished through the advantageous difference in solubility between $Na_2CO_3$ and $NaHCO_3$ and the enhancement of said difference by the presence of NaBr as co-solute. The present inventive process is not applicable to the other alkali metal bromide-alkali metal carbonate system which can be appreciated from the following considerations of the systems $KBr-K_2CO_3$ and $LiBr-Li_2CO_3$. The solubility difference in water between $KHCO_3$ and $K_2CO_3$ is much smaller than in the analogous sodium system. Also the solubility difference in said potassium system appears to decrease and even invert (i.e., the carbonate becomes less soluble than the bicarbonate) as the KBr content of the solution is increased from 0 to 20 weight parts per 100 weight parts of water.

The system $LiBr-Li_2CO_3$ differs materially from the analogous sodium and potassium systems and presents a different problem. In the lithium system, lithium bromide is very soluble in water and its water solubility increases with increasing temperature. But lithium carbonate is rather insoluble in water and its water solubility decreases with increasing temperature. Selective aqueous extraction of LiBr from incinerator flue effluent particulates and gases or from carbonaceous residue of the pyrolysis carbonization product can be readily accomplished. But $Li_2CO_3$ cannot be water extracted. Moreover, $Li_2CO_3$ left unextracted by aqueous scrubbing of incinerator effluent is contaminated with oxides of corrosion metals originally present in aromatic acid process residue. The reuse of such metal oxide contaminated $Li_2CO_3$ for catalyst metal recovery is possible but requires a modification of that route for catalyst metal recovery taken up in copending application Ser. No. 299,410, filed Oct. 20, 1972.

The efficacy of using $CO_2$ for the removal of $Na_2CO_3$ from co-dissolved NaBr has been illustrated. Since the success of such separation makes the present process commercially attractive, the application of said separation and recovery of useful aqueous NaBr solutions to leach insoluble solids and the use of aqueous phases obtained from tere- or iso-phthalic acid process residues will be illustrated.

The terephthalic acid process residue (TA Process Residue) shown in Table I below was obtained after separating terephthalic acid and removing substantially all acetic acid from the fluid effluent from oxidizing p-xylene (95%-xylene) with air in the presence of acetic acid solution containing cobalt, manganese and bromide from ionic and organic bromides. Also shown in Table I are extract insolubles and catalyst free extract solution (aqueous phase) obtained by water extraction of such TA Process Residue (solvent to residue weight ratio of 4:1) at 81° C. for 30 minutes, cooling the mixture to ambient temperature, separating aromatic compounds precipitated at ambient temperature by filtration from the extract solution, adding to the filtrate heated to 75° C. sufficient sodium bicarbonate to a final pH of 8.1 as measured by pH meter during bicarbonate addition, and separating catalyst metal carbonate precipitate from pH 8.1 aqueous phase. The component contents are shown in grams from 50 grams TA Process Residue, 36.3 grams insolubles and aqueous phase which contained 230 grams of water.

TABLE I

Composition of TA Process Residue, insolubles and aqueous phase in grams per 50 grams TA Process Residue

| Components | TA residue | Insolubles | Aqueous phase separated from metal carbonates |
|---|---|---|---|
| Benzoic acid | 7.4 | 3.45 | 3.95 |
| Toluic acid | 13.4 | 12.2 | 1.10 |
| Phthalic acid | 0.6 | 0.07 | 0.53 |
| Iso- and terephthalic acid | 9.0 | 8.3 | 0.70 |
| Methyl dibasic acids | 1.3 | 1.0 | 0.30 |
| Trimellitic acid range | 2.2 | 0.2 | 2.00 |
| 4-carboxybenzaldehyde | 4.5 | 4.1 | 0.40 |
| Tolualdehyde | 0.2 | 0.04 | 0.16 |
| Benzaldehyde | 0.002 | 0.001 | 0.001 |
| Terephthalaldehyde | 0.14 | 0.04 | 0.10 |
| Methylbenzyl acetate | 0.01 | 0.005 | 0.005 |
| Formylacetate | 0.08 | 0.01 | 0.07 |
| Benzyl benzoate | 0.004 | 0.01 | 0 |
| Phthalide | 1.0 | (1) | 1.0 |
| Cobalt | 0.76 | 0.02 | 0.02 |
| Manganese | 1.265 | 0.05 | 0 |
| Bromine | 1.10 | 0.05 | 1.05 |
| Iron | 0.045 | 0.04 | 0.00006 |
| Calcium | | | |
| Chromium | | | |
| Copper | | | |
| Magnesium | 0.02 | 0.003 | 0.017 |
| Molybdenium | | | |
| Aluminum | | | |
| Nickel | | | |
| Silica | | | |
| Sodium | 0.15 | 0.007 | 10.61 |
| Unidentified | 6.8 | 6.7 | 0.1 |

[1] None detected.

EXAMPLE 6

The Insolubles and Aqueous Phase shown in Table I are combined, accumulated to obtain 28.83 kg. of the composite, the composite is burned at 980° C. and the solids collected from said combustion are quenched, scrubbed and leached with water at 60° C. Said solids amount to 2.627 kg. and comprise 2.373 kg. sodium carbonate, 0.142 kg. sodium bromide and 0.112 kg. metal oxides. A total of 8.55 kg. of scrubber liquor is recovered by filtration to remove the metal oxides. The filtrate contains 27.75% $Na_2CO_3$ and 1.66% NaBr. The filtrate, cooled to 40° C., is combined with a concentrate containing 46% NaBr and 3% $Na_2CO_3$ in the ratio of 8.55 kg. filtrate and 4.13 kg. concentrate per hour as feed to Honigmann apparatus operated at 40° C. and 50 p.s.i.g. $CO_2$ is supplied by water scrubbed and quenched incinerator gas pressurized to 50 p.s.i.g. and cooled to 60° C. After separation of precipitated $NaHCO_3$, by a continuous, vacuum filter having rolls to press mother liquor and water wash liquor from the filter cake, 3.17 kg. of water per hour is removed by evaporation of the filtrate to provide 4.44 kg./hr. of concentrate containing 46% NaBr and 3% $Na_2CO_3$ by weight for recycle to carbonation and $NaHCO_3$ precipitation. There are recovered as products 0.31 kg. of concentrate (46% NaBr and 3% $Na_2CO_3$) and 3.75 kg. $NaHCO_3$ (dry basis) containing 3.6% NaBr.

EXAMPLE 7

There are incinerated at 980–1000° C. 25,887 pounds per hour of composite of Insolubles and Aqueous Phase after catalyst metal recovery from TA Residue differing in source from that of Table I. Incinerator flue solids at 1124 pounds per hour containing 990 pounds $Na_2CO_3$, 120 pounds NaBr and 14 pounds metal oxides. Such solids are scrubbed with 2680 pounds of water per hour at ambient temperature to provide 3790 pounds of extract solution containing 26.1% $Na_2CO_3$ and 3.2% NaBr. Incinerator flue gas (11% $CO_2$ by volume) cooled to 120° F. by said scrubbing is injected into a carbonation vessel to which is also fed 3790 pounds per hour of scrubber liquor and 1711 pounds per hour of concentrate cooled to 25° C. containing 46.2% NaBr and 2.9% $Na_2CO_3$. By means of a filter there are removed from the precipitation vessel 1588.3 pounds of sodium bicarbonate product per hour which upon heating yields 1012.8 pounds of $Na_2CO_3$ containing 3% NaBr per hour, a 99.2% recovery of $Na_2CO_3$.

The filtrate at 4552 pounds per hour is heated to evaporate 2548 pounds of water per hour (24 pounds per hour of $CO_2$ is vented) and provide 1970.5 pounds per hour of concentrate, from which 259.5 pounds per hour is the recovered NaBr product solution (46.2% NaBr and 2.9% $Na_2CO_3$) and the remaining 1711 pounds per hour is fed to the carbonation as before mentioned. The sum of NaBr in the product solution and in the carbonate product represents substantially complete recovery of bromine content of TA Residue.

EXAMPLE 8

A composite of Insolubles and Aqueous Phase from catalyst metal recovery from TA Residue similar to those described in Table I is here used for bromine recovery. The TA Residue and Insolubles are the same but the catalyst metal precipitation from the aqueous extract solution was accomplished with sodium carbonate in place of sodium bicarbonate. Such replacement of sodium bicarbonate with sodium carbonate requires less of it because of its higher basicity. Such resulting Aqueous Phase contains 4.18 grams sodium rather than 10.61 grams.

An accumulation of Insolubles and Aqueous Phase amounting to 35 kg. is incinerated and the solids in the flue effluent, amounting to 1.086 kg. and containing 867 grams $Na_2CO_3$, 142 grams NaBr and 112 grams metal oxides, are scrubbed with a total of 2.327 kg. water. The scrubber liquor is cooled to 30° C. and separated from metal oxides. The separated scrubber liquor (3.33 kg.) contains 26% $Na_2CO_3$ and 4.26% NaBr by weight.

EXAMPLE 9

The preferred combination of catalyst metal and bromine recoveries is conducted with TA Process Residue according to the following continuous process wherein the quantities of materials used and obtained are on an hourly basis.

A. Leaching of TA Process Residue

There are combined in a closed, stirred vessel 19,808 pounds of water at a temperature of 74° C. and 0 p.s.i.g. and 4952 pounds of molten TA Process Residue at a temperature of 190° C. and a pressure of 65 p.s.i.g. Said Residue contains on a weight basis 90.25% acidic and neutral aromatic compounds, 1.00% (50 pounds) cobalt, 3.00% (150 pounds) manganese, 5.59% (277 pounds) bromine, 0.04% iron, 0.06% extraneous corrosion metals, and 0.06% sodium. The mixture of water and molten residue is stirred during a residence time of 60 minutes to produce a slurry of insoluble solids in aqueous extract solution. Said slurry, as a result of said combining and stirring, is at a temperature of 82° C. and a pressure of 20 p.s.i.g. and is fed to a continuous, rotary filter and washed thereon with 4952 pounds of water at 82° C. from which is obtained 3562 pounds of filter cake, 26,150 pounds of filtrate and 681 pounds of vented water vapor. The filter cake aromatic insolubles is discharged at 77° C. and 0 p.s.i.g. and is reserved for bromine recovery. The filtrate and wash are collected at 77° C. and 15 p.s.i.g. for catalyst metal recovery.

B. Catalyst Metal Recovery

The 26,150 pounds of filtrate and water wash at 77° C. and 15 p.s.i.g. contains 23,869 pounds of water, 48 pounds cobalt, 142 pounds manganese, 268 pounds bromine, 3 pounds sodium and 1820 pounds aromatic compounds. The composite of filtrate and water wash is combined and mixed with 1188 pounds of sodium carbonate which produces an aqueous phase pH of 8.0–8.1 at which precipitation of cobalt and manganese carbonates is completed. The slurry of said carbonate precipitate in the aqueous phase is pumped at 30 p.s.i.g. to a pressurized centrifuge for recovery and washing of the carbonate precipitate. The wash water, 210 pounds, is at 82° C. and 0 p.s.i.g. There are recovered 601 pounds of washed carbonate precipitate at 77° C. and 0 p.s.i.g. and collected 26,947 pounds of wash liquor diluted aqueous phase at 77° F. and 30 p.s.i.g. for bromine recovery.

The washed carbonate precipitate without drying is combined and mixed in a dissolving vessel with 808 pounds of acetic acid and 808 pounds of water both at a temperature of 82° C. and at ambient pressure. There is vented 149 pounds of $CO_2$ and 63 pounds of water vapor from said dissolving vessel from which there is withdrawn 2005 pounds acetic acid solution containing 1005 pounds of water, 402 pounds acetic acid, 2 pounds sodium, 1 pound bromine, 48 pounds cobalt metal in its acetate, 141 pounds manganese as metal in its acetate and 406 pounds aromatic compounds. There are recovered 96% of the cobalt and 94% of the manganese originally in the TA Process Residue.

C. Incineration

The 26,947 pounds of collected aqueous phase and 3562 pounds of filter cake insolubles are combined and mixed in an incinerator feed vessel. Said mixture contains 4444 pounds acidic and neutral aromatic compounds, 2 pounds cobalt, 9 pounds manganese, 276 pounds bromine, 2 pounds iron, 3 pounds extraneous corrosion metals, 516 pounds sodium and 24,816 pounds water. Hot gases: 3289 pounds oxygen, 32,500 pounds nitrogen, 900 pounds $CO_2$ and 669.8 pounds water vapor at 1000° C. are used to dry the incinerator feed for incineration of its solids and are vented with 19,564 pounds of water at 150° C. The solids from incineration at 1000° C. amount to 1385 pounds and are quenched to 100° C. at 0 p.s.i.g. with 4006 pounds water diluted aqueous wash liquor at 30° C. and 0 p.s.i.g. containing 43 pounds $NaHCO_3$ and 181 pounds NaBr, wherein said wash liquor is from washing of later separated $NaHCO_3$. The incinerator solids contain 1007 pounds sodium carbonate, 355 pounds sodium bromide and 23 pounds metal oxides. The results slurry at 100° C. and 0 p.s.i.g. amounting to 5125 pounds (166 pounds of water vaporized by quenching) is transferred to the carbonation step.

D. Carbonation and Precipitation of Sodium Bicarbonate

The 5125 pounds of slurry at 100° C. and 0 p.s.ig. from quenching incinerator solids and 2063 pounds of hereafter obtained aqueous sodium bromide (32.5% NaBr) solution at 49° C. and 0 p.s.i.g. are combined and the undissolved metal oxides, 23 pounds are separated as filter cake. The aqueous solution recovered, 7142 pounds, is charged 49° C. and 0 p.s.i.g. as feed to the bottom of a carbonating tower into the bottom of which is blown 747 pounds $CO_2$ and 16 pounds of water vapor at 30° C. and dispersed in said solution feed. The wet $CO_2$ gas is obtained by combining 344 pounds $CO_2$ containing 97 pounds water vapor from catalyst metals recovery and 403 pounds $CO_2$ containing 1026 pounds water vapor from conversion of sodium bicarbonate to sodium carbonate and condensing out 1007 pounds of water. The solution fed to the tower contains 1066 pounds sodium carbonate, 43 pounds sodium bicarbonate, 1207 pounds sodium bromide and 4826 pounds of water. The suspension of sodium bicarbonate in the aqueous solution of sodium bromide overflows from the top of the carbonating tower, is collected and charged at 49° C. and 0 p.s.i.g. to a straight-line filter back-washed with 1034 pounds of 30° C. water. A total of 1192 pounds of aqueous wash is recycled to quenching of incinerator solids. A total of 5000 pounds of filtrate at 49° C. and 0 p.s.i.g. are obtained containing 150 pounds sodium bicarbonate and 1000 pounds (20%) sodium bromide. The filtrate is concentrated by evaporation by removal of 1896 pounds water vapor at which time 39 pounds $CO_2$ are liberated. The evaporator is charged with the 5000 pounds of filtrate at 49° C. and heated with steam at 400 p.s.i.g. and 230° C. The aqueous solution concentrate at 100° C. amounts to 3065 pounds and contains 1000 pounds (32.5%) sodium bromide and 95 pounds sodium carbonate. From said evaporation there is withdrawn an amount of concentrate equivalent in bromine content to 90–92% of the bromine content of TA. For example, in this process a concentrate in an amount of 1002 pounds containing 327 pounds sodium bromide (equivalent to 91.7% of the bromine in original TA Process Residue) is taken for source of bromine for p-xylene oxidation also using the recovered cobalt and manganese acetates. The remaining 2063 pounds of evaporator concentrate is recycled for mixing with slurry from quenching and leaching incinerator solids.

The above described preferred combination process for catalyst metal and bromine recoveries achieved recovery of 96% of the cobalt, 94% of the manganese and 91.7% of the bromine present in the original TA Process Residue.

EXAMPLE 10

For this example there is ground to pass through 30 mesh (Tyler standard) sieve a TA Process Residue having an Acid Number (mg. KOH/gm.) of 425, 1.51% cobalt, 2.53%. manganese, 2.2% bromine, 0.43% extraneous corrosion metals and 99.33% aromatic compounds. To a vessel having a stirrer and jacket for heating the contents of the vessel there are charged (on an hourly basis) 10 kg. of ground residue, 402 kg. soda ash and 19.5 kg. water at 60° C. The mixture is stirred and heated to 60° C. and held at 60° C. for 60 minutes. The contents of the vessel are discharged to a filter to recover undissolved solids and collect the filtrate. The vessel is washed with 0.5 kg. water at 60° C. said water wash is used to wash the filter cake and is then added to the filtrate. The combined filtrate and water wash contains about 24.5 weight percent sodium salts.

The filter cake neutral aromatic compounds and metal carbonates, is charged to the receiver of a steam distillation unit and heated to 100° C. Steam at 110° C. is injected into and through the solids to remove with exhaust water vapor the neutral aromatic materials which are collected with water condensate. The mixture of water and neutral aromatic compounds is combined with the solution of sodium salts. The mixture is spray dried and the recovered solids are heated to 1000° C. with a controlled flow of air until the organic materials are converted to a carbonaceous mass. The carbonaceous mass is quenched with water to 100° C. and leached with 11.2 kg. water at 100° C. and ambient temperature. The extract solution contains 3.92 kg. sodium carbonate and 0.263 kg. sodium bromide.

The extract solution is reacted with $CO_2$ in the carbonating tower described in Example 9 and the suspension of sodium bicarbonate filtered and water washed as described in that example. The filtrate and water wash are combined and concentrated by evaporation of water to a solution containing 30 weight percent sodium bromide. This solution is reacted with $CO_2$ in a second carbonating tower, the bicarbonate filtered and washed as before described. The combination of filtrate and wash are again evaporated but this time to a 46% NaBr content. The concentrate contains about 1.5 weight percent sodium bicarbonate. In this manner 92% of the bromine in the TA Process Residue is recovered as aqueous solution of sodium bromide. The remaining 8% bromine is in the recovered sodium bicarbonate. Heating the recovered sodium bicarbonate to 100° C. converts it to sodium carbonate which can be recycled with a small amount of make up sodium carbonate to the step of dissolving TA Process Residue and metal carbonate precipitate.

The metal carbonate precipitate is dissolved in an amount of acetic acid equivalent to 1.15 times the theoretical amount required to dissolve the cobalt, manganese and iron carbonates as their acetates. In this case a mixture of 2.04 kg. acetic acid and 0.89 kg. water are used to dissolve the metal carbonate at 85° C. The solution is then heated above its boiling point and 0.258 kg. of 55% acetic acid is removed by distillation and a precipitate forms. The precipitate is an insoluble form of extraneous corrosion metals. The resulting mixture is cooled to 100° C. and filtered to remove the precipitate. The filtrate contains cobalt and manganese acetates in amounts equivalent to 95% of cobalt and 94% of manganese originally in the TA Process Residue.

The foregoing processes of Examples 6 through 10 can be used with isophthalic acid process residues to achieve the recovery of at least 90% of the bromine as sodium bromide in aqueous solution and 95–97% of the cobalt and 90–95% of the manganese as their acetates in acetic acid solution as before disclosed and illustrated.

What is claimed is:

1. A method of recovering bromine as sodium bromide and also producing sodium bicarbonate from at least the aqueous phase obtained from recovery of catalyst metal carbonate product from tere- or isophthalic acid process residue containing water soluble salts of bromine and at least cobalt as catalyst metal, corrosion metals including iron and acidic and neutral aromatic compounds by treatment of such residue with water in an amount of 1.0–10.0 weight parts per weight part of water and with sodium bicarbonate or carbonate to form a catalyst metal carbonate precipitate and separating such precipitate from the resulting aqueous phase, which method comprises thermally converting at a temperature in the range of 900–1000° C. the solute content of said aqueous phase to a solid mixture containing sodium bromide and sodium carbonate and water insoluble solids, leaching said solid mixture with water in an amount to form a solution of all sodium bromide and substantially saturate said solution with respect to sodium carbonate, separating the extract solution from insoluble solids, converting the sodium carbonate in said extract solution to precipitated sodium bicarbonate by reaction with carbon dioxide in the presence of sodium bromide in an amount of at least 10 weight percent of the solution at a temperature in the range of at least 20° C. but not exceeding the temperature for reversing said conversion of carbonate to bicarbonate, separating sodium bicarbonate precipitate from the aqueous solution of sodium bromide, washing the recovered precipitate with water, adding the aqueous wash liquor to the step of dissolving the mixture of sodium bromide and sodium carbonate, concentrating said separated aqueous solution of sodium bromide to a sodium bromide content of 30 to 45 weight percent by the removal of water from said composite.

2. The method of claim 1 wherein the aqueous phase and insoluble aromatic compounds remaining from said catalyst metal recovery are subjected to said thermal conversion and wherein said conversion of sodium carbonate to sodium bicarbonate is conducted at 40 to 49° C.

3. The method of claim 2 wherein the aqueous phase aromatic insolubles is obtained by leaching the phthalic acid process residue with water, the aqueous leach solution is reacted with sodium bicarbonate or carbonate to a solution pH of 7 to 8.1 for precipitation of catalyst metal carbonate, catalyst metal carbonate precipitate is separated from the resulting aqueous phase and wherein the solute content of said aqueous phase and said insolubles are subjected to said thermal conversion to obtain said solid mixture of sodium bromide and sodium carbonate.

4. The method of claim 3 wherein the aqueous phase is obtained from water leaching of terephthalic acid process residue containing water soluble cobalt and manganese salts in addition to corrosion metals, acidic and neutral aromatic compounds and water soluble bromine salts; wherein a portion of said concentrated aqueous sodium bromide solution is combined with the aqueous solution from leaching incinerator solids; and wherein the sodium bromide solution separated from sodium bicarbonate is concentrated by evaporation at 100° C.

5. The method of claim 1 comprising leaching terephthalic acid process residue containing bromine and the catalyst metals cobalt and manganese with water in the respective weight ratio of 1.0:1.0–10, separating aromatic insolubles from the aqueous extract solution, adding an amount of sodium carbonate to said extract solution to increase its pH to 7 to 8.1 for precipitation of carbonates of the catalyst metals, separating catalyst metal carbonates from the pH adjusted aqueous phase, combining said aqueous phase with said aromatic insolubles, incinerating the composite to a solid mixture of sodium bromide and sodium carbonate.

6. The method of claim 5 wherein leaching of said residue is conducted at 82° C. and 20 p.s.i.g. with water added at 74° C. and 0 p.s.i.g. in the weight ratio to said residue of 4:1 and with said residue as a liquid at 190° C. and 65 p.s.i.g., separating aromatic insolubles from the aqueous extract solution of the slurry produced at 82° C and 20 p.s.i.g., washing said aromatic insolubles with water at 82° C. in an amount substantially equal in weight to said residue, containing such obtained aqueous wash liquor with the aqueous extract solution to dilute it to a solution at 77° C. and 15 p.s.i.g., combining said dilute solution with an amount of sodium carbonate to adjust the pH of the resulting aqueous phase to pH of 8.0–8.1 for substantially complete precipitation of carbonates of the catalyst metals, separating the pH 8.0–8.1 aqueous phase from catalyst metal carbonates, dissolving catalyst metal carbonates at 82° C. with a solvent wherein there are present equal weight parts of water and acetic acid and wherein the acetic acid is about twice the amount required to convert the catalyst metal carbonates to their acetates, incinerating at 980° C. a mixture of the pH 8.0 to 8.1 aqueous phase and the aromatic insolubles before separated, quenching the sodium bromide and sodium carbonate-containing incinerator solids to and leaching them at 100° C. and 0 p.s.i.g. with water diluted later obtained aqueous wash liquor containing sodium bromide and sodium bicarbonate from the sodium carbonate recovery, combining the resulting slurry with a portion of later obtained concentrated aqueous solution of sodium bromide, separating metal oxides from said composite aqueous solution, reacting at 49° C. and ambient pressure carbon dioxide with sodium carbonate content of said composite aqueous solution, wherein the amount of $CO_2$ is that required to convert said carbonate to its bicarbonate and is obtained from $CO_2$ liberated from the foregoing catalyst metal recovery and combining of the aqueous phase and aromatic insolubles and later thermal conversion of the separated solid sodium bicarbonate to sodium carbonate, separating sodium bicarbonate from the resulting carbonation reaction aqueous solution, washing the separated bicarbonate with water, recycling the wash liquor to said quenching and leaching step, thermally converting the washed bicarbonate to sodium carbonate, recycling said carbonate to said precipitation of catalyst metal carbonates, concentrating the carbonation reaction aqueous solution to a sodium bromide content of 30 to 45 weight percent, withdrawing as product a portion of said concentrate equivalent in bromide content to 90–92% of the bromine content of the terephthalic acid process residue, and recycling the remaining portion of the concentrate for addition to aqueous extract solution from leaching of incinerator solids.

References Cited

UNITED STATES PATENTS

| | | | |
|---|---|---|---|
| 3,673,154 | 6/1972 | Trevillyan | 423—140 X |
| 2,964,559 | 12/1960 | Burney et al. | 260—525 |
| 2,865,708 | 12/1958 | Dinsmore et al. | 260—525 |
| 3,642,657 | 2/1972 | Wennerberg et al. | 260—523 |
| 3,780,096 | 12/1973 | Johnson et al. | 260—524 R |

OSCAR R. VERTIZ, Primary Examiner

B. E. HEARN, Assistant Examiner

U.S. Cl. X.R.

423—50, 144, 207, 208, 499; 260—524 R, 525; 252—182

UNITED STATES PATENT OFFICE
CERTIFICATE OF CORRECTION

Patent No. 3,840,641      Dated  OCTOBER 8, 1974

Inventor(s)   GENE L. WAMPFLER AND HANS P. POHLMANN

It is certified that error appears in the above-identified patent and that said Letters Patent are hereby corrected as shown below:

| Col. | Line | |
|---|---|---|
| 6 | 16 | "system" should be -- systems -- |
| 6 | 70 | "bicrabonate" should be -- bicarbonate -- |
| 9 | 37 | "results" should be -- resulting -- |
| 12 | 30 | "containing" should be -- combining -- |

Signed and sealed this 7th day of January 1975.

(SEAL)
Attest:

McCOY M. GIBSON JR.
Attesting Officer

C. MARSHALL DANN
Commissioner of Patents